Feb. 8, 1938.  C. E. CARPENTER  2,107,325
DOUGHNUT COOKING MACHINE
Original Filed May 6, 1933   3 Sheets-Sheet 1
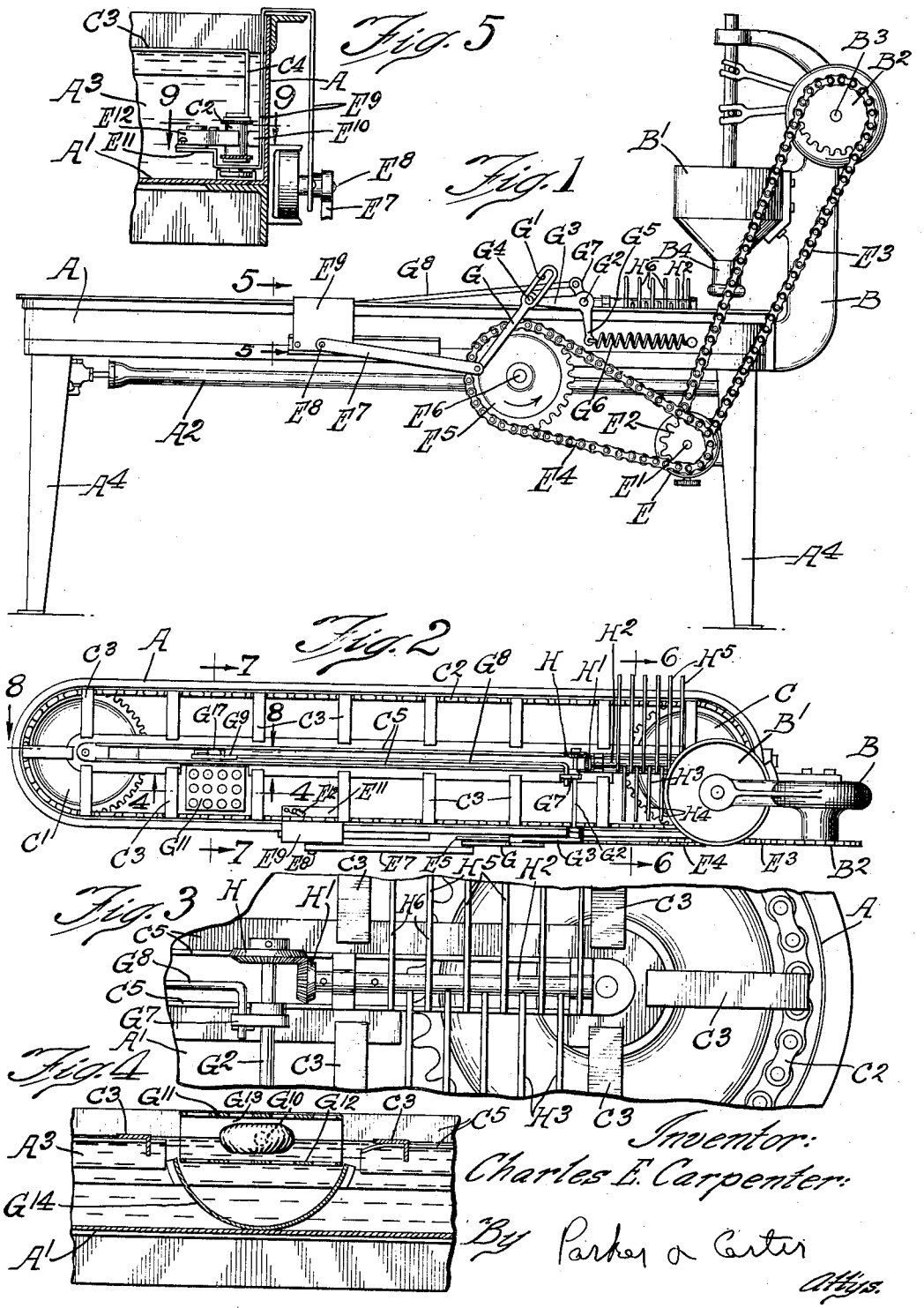

Feb. 8, 1938.  C. E. CARPENTER  2,107,325
DOUGHNUT COOKING MACHINE
Original Filed May 6, 1933  3 Sheets-Sheet 2
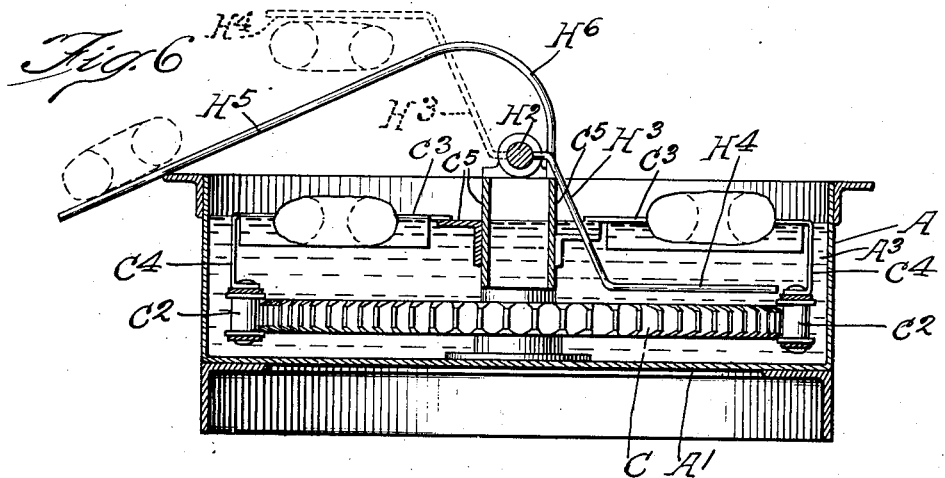
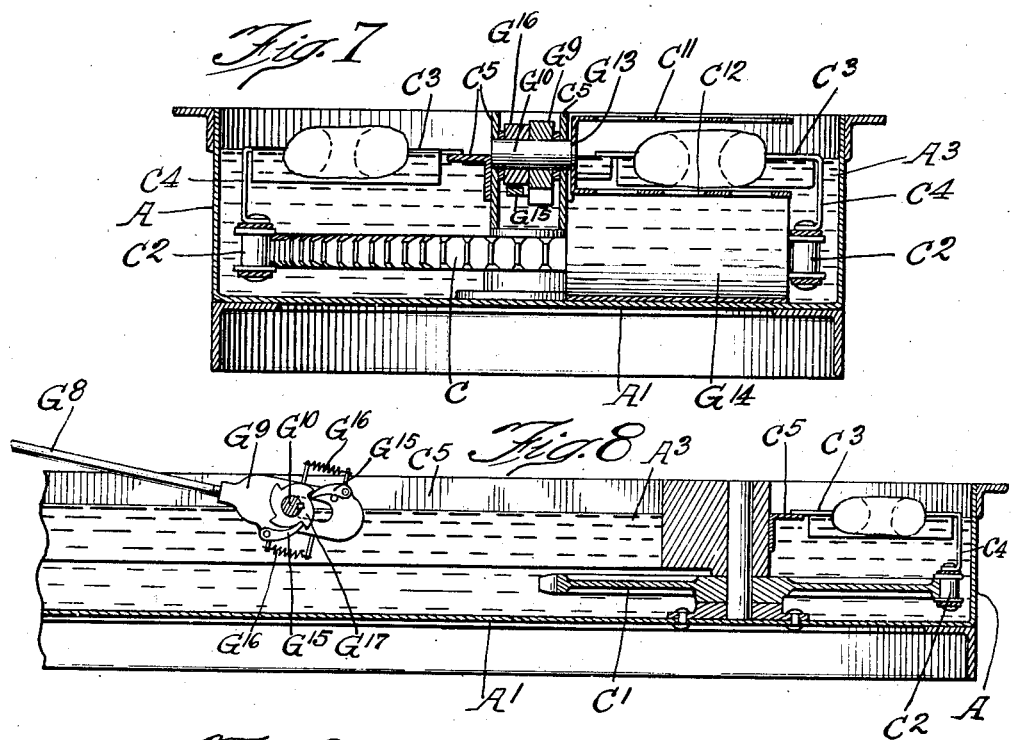
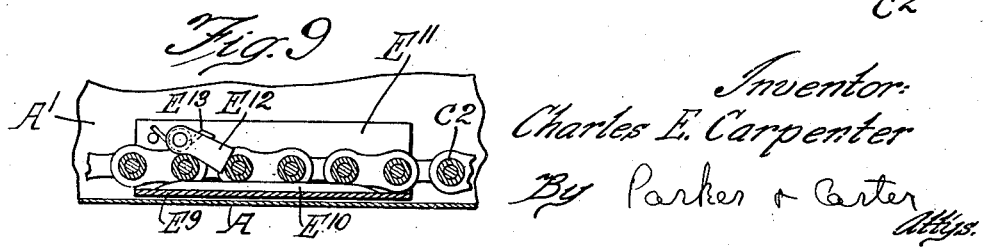
Inventor:
Charles E. Carpenter
By Parker & Carter
Attys.

Feb. 8, 1938.  C. E. CARPENTER  2,107,325
DOUGHNUT COOKING MACHINE
Original Filed May 6, 1933   3 Sheets-Sheet 3

Inventor:
Charles E. Carpenter
By Parker & Carter
Attys.

Patented Feb. 8, 1938

2,107,325

UNITED STATES PATENT OFFICE 2,107,325

DOUGHNUT COOKING MACHINE

Charles E. Carpenter, Chicago, Ill.

Continuation of application Serial No. 669,641, May 6, 1933. This application January 21, 1935, Serial No. 2,728

30 Claims. (Cl. 53—7)

My invention relates to an improvement in cooking devices and is applicable for example in cooking doughnuts. One object is the provision of means for cooking the individual article to be cooked during a single passage of the article about a predetermined circuit. Another object is the provision of improved conveying means for conveying the article around the circuit. Another object is the provision of improved means for turning the article after it has been cooked on one side. Another object is the provision of improved ejector means for ejecting the article from the cooking cycle. Another object is the provision of improved drive means for the device above described. Other objects will appear from time to time in the course of the specification and claims.

The present application is a continuation of my application, Ser. No. 669,641, filed May 6, 1933.

I illustrate my invention more or less diagrammatically in the accompanying drawings, wherein—

Figure 1 is a side elevation;

Figure 2 is a plan view;

Figure 3 is a partial plan view on an enlarged scale;

Figure 4 is a section on the line 4—4 of Figure 2;

Figure 5 is an enlarged section on the line 5—5 of Figure 1;

Figure 6 is an enlarged section on the line 6—6 of Figure 2;

Figure 7 is an enlarged section on the line 7—7 of Figure 2;

Figure 8 is an enlarged section on the line 8—8 of Figure 2;

Figure 9 is a section on the line 9—9 of Figure 5;

Like parts are indicated by like symbols throughout the specification and drawings.

Figure 10:
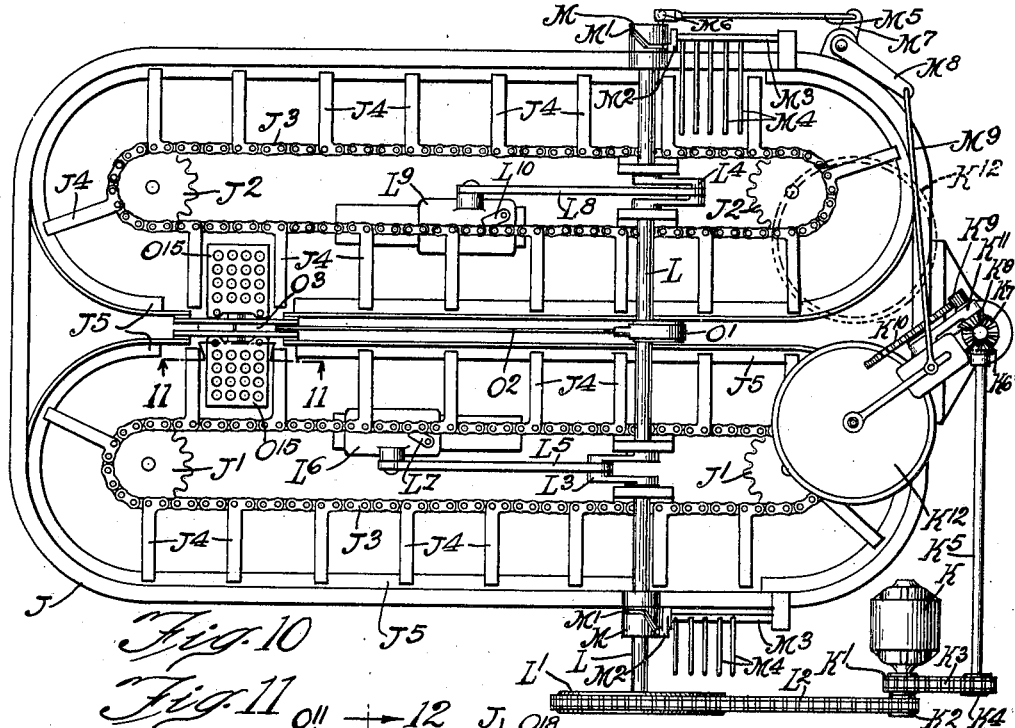
Figure 10 is a plan view of a variant form.

Referring to the drawings and particularly to the form of Figures 1 and following, A generally indicates any suitable frame or container, with any suitable bottom $A^1$ beneath which is any suitable burner or heating device $A^2$ for heating the body of grease $A^3$ normally within the container during use. $A^4$ are any suitable supporting legs.

B is an outer upward extension or bracket mounted on the frame A which includes any suitable discharge device $B^1$ the details of which do not of themselves form part of the present invention, whereby doughnuts or other articles to be cooked can be discharged. $B^2$ is any suitable sprocket mounted on the shaft $B^3$, for actuating the doughnut discharge device, and $B^4$ is the discharge nozzle.

Mounted for rotation about vertical axes within the container A are the sprockets C, $C^1$. It will be observed that the sprocket C, shown at the right end of Figure 2, is positioned beneath the discharge member $B^4$ and serves to receive the blanked raw doughnuts as they are discharged to the grease. Passing around the sprockets C, $C^1$, is any suitable endless chain or conveyor generally indicated as $C^2$ which is provided with inwardly extending flights $C^3$ of any suitable form or cross-section. The flights may for example be angle irons and may be mounted upon brackets $C^4$ extending upwardly from any suitable links in or members of the chain. It will be understood that when the blanks are first dropped in the grease they are heavier than the grease and sink to the bottom and are received on and rotated by the sprocket C. Shortly, by the influence of heat, they pop up and rise and from then on are conveyed along the surface of the grease by contact with the flights $C^3$. As will be clear from the figures herein the flights extend inwardly a sufficient distance so that the space between each pair of flights is a pocket from which the floating doughnut or article cannot escape. The space between opposed straight extensions of the belt may be borne by any suitable upstanding flanges $C^5$ which not merely delimit the channels for the moving articles, but serve as supports for the driving mechanism later to be described, and also serve to hold ledges $C^6$ for supporting the ends of the flights $C^3$.

E diagrammatically indicates any suitable motor, the drive shaft $E^1$, and drive sprockets $E^2$ thereon. About one of these drive sprockets extends a chain $E^3$ which extends about the sprocket $B^2$, earlier mentioned, which drives the discharge mechanism for the raw doughnut blanks. $E^4$ is a second belt or chain extending about the driven sprocket $E^5$ on the shaft $E^6$. Pivoted to said sprocket $E^5$ is a link $E^7$ the outer end of which is pivoted as at $E^8$ to a slide element $E^9$ shown in some detail in Figure 5. The slide includes an abutment plate $E^{10}$ opposed to one side of the chain, a flange $E^{11}$ and a dog $E^{12}$ on said flange actuated by a spring $E^{13}$ to oppose the chain in such fashion that when the slide $E^{10}$ moves to the right, referring to the position in which the parts are shown in Figure 9, the dog $E^{12}$ engages a link or cross bar of the chain and thrusts the chain against the plate $E^{10}$. When the slide moves in the opposite direction, when the sprocket $E^5$ rotates, the spring $E^{12}$ permits the dog to act as an over-running clutch element. Thus, in response to rotation of the sprocket $E^5$, and the consequent reciprocation of the slide $E^9$, the belt or chain $C^2$ is given a unidirectional step by step movement timed in relation to the rotation of the motor shaft or of the sprocket $E^5$.

Pivoted to the sprocket $E^5$ is a drive link G with the lost motion I or slot $G^1$ at the opposite end. $G^2$ indicates a transverse shaft mounted to one end of which is a bell crank lever having one arm $G^3$ terminating in a pin $G^4$ penetrating the slot $G^1$. The other arm $G^5$ is secured to a spring $G^6$ which tends normally to impart a counter-clockwise rotation of the shaft $G^2$, referring to the parts in the position in which they are shown in Figure 1. As the sprocket $E^5$ rotates from the position in which it is shown in Figure 1, from the direction of the arrow, the slot $G^1$ permits movement of the link G without affecting the position of the shaft $G^2$. When the sprocket has made in the neighborhood of one-half a revolution, so that the link G is located on the opposite periphery of the sprocket from that in which it is shown in Figure 1, then the lower end of the slot $G^1$ engages the pin $G^4$ and gives a clockwise rotation to the shaft $G^2$. Mounted on the shaft $G^2$ and held against rotation in relation therewith is a lever member $G^7$ to which is secured a pull rod $G^8$ as shown in Figures 2 and 3, the pull rod extending to the slotted sliding member $G^9$ upon the rotary shaft $G^{10}$. Secured to this rotary shaft is a turning device which includes a perforated upper plate $G^{11}$ and a perforated lower plate $G^{12}$ joined at one end by a side plate $G^{13}$. The outer edge is left open, as is clear from Figure 7, to permit the penetration between the two plates of the individual flights $C^3$ of the chain $C^2$. Referring to Figure 8, note that the shaft $G^{10}$ penetrates the slotted sliding member $G^9$ and longitudinal movement of the member $G^9$ by means of the pull rod $G^8$ is limited by the length of the slot. Pivotally mounted upon the sliding member $G^7$ are two pawls $G^{15}$ which are held by means of springs $G^{16}$ in engagement with the ratchet wheel $G^{17}$ keyed to the shaft $G^{10}$. The parts are so proportioned to rotate the shaft $G^{10}$ through an angle of 180 degrees each time the pull rod $G^8$ is actuated by means of the link G and associated parts. Note that an arcuate member $G^{14}$ is provided adjacent the plates $G^{11}$ and $G^{12}$, whereby any escape of the doughnut from between the plates during the turning process is prevented. As the outer edge of the space between the plates $G^{11}$ and $G^{12}$ is open, the flights can pass freely therethrough and carry the doughnuts on through from between the plates $G^{11}$ and $G^{12}$ after the plates have rotated through an angle of 180 degrees to turn the half cooked doughnuts.

In order to eject the doughnuts at the end of the cooking excursion I provide the following mechanism. Mounted on the end of the shaft $G^2$ is a bevel gear H which is in mesh with the corresponding bevel gear $H^1$ on the shaft $H^2$. Mounted on the shaft $H^2$ are a plurality of fingers $H^3$ the position of which is shown in Figure 6.

The lower ends of the fingers are in normal horizontal position as at $H^4$, and at a level below the normal position of the flights and doughnuts. $H^5$ indicates a plurality of fingers downwardly and outwardly inclined each from an arcuate section $H^6$. The fingers $H^3$ and $H^5$ are staggered in relation to each other, as is shown in Figure 3. Therefore, at each rotation of the shaft $G^2$ the fingers $H^3$ and their doughnut engaging portions $H^4$ will be lifted from the full line of Figure 6 to the dotted line of Figure 6, passing between the fixed fingers $H^5$ and $H^6$. The doughnuts are thereby dropped upon the downwardly inclined portions $H^5$ and are discharged to any suitable receiving device. This movement or discharge of the doughnuts is well indicated in Figure 6.

Thus the motor E through the driving mechanism above described performs several separate functions. Through the chain $E^3$ it drives the mechanism for discharging the raw blanks to the grease. Through the sprocket $E^5$ and the link $E^7$ it actuates the slide $E^9$ and imparts to the chain $C^2$ its unidirectional step by step movement. Through the link or rod $G^8$ it actuates the turning mechanism, the plates $G^{11}$ and $G^{12}$ and turns each doughnut after the doughnut has been carried by the flights around the cooking circuit to that point. The doughnut is cooked first on one side primarily, since it floats higher in the grease, as shown for example in Figure 4. Then finally, through the bevel gear H and the shaft $H^2$ the cooked doughnuts are expelled from the circuit at a point just short of the point where the raw doughnuts are added. Thus there is always a doughnut between each pair of flights and the cooking sequence may be constantly maintained.

Referring to the modified form of Figures 10 and following I illustrate a single large container J in which are positioned two pairs of sprockets $J^1$, $J^1$ and $J^2$, $J^2$. About each of the pairs of sprockets passes the chain $J^3$ with flights $J^4$ on it which will be understood to be substantially the same as the chains and flights shown in the earlier figures. The flights of the chains, however, project outwardly instead of inwardly. The outer ends of the flights are supported on angles or guides $J^5$ conforming generally to the desired path of the doughnuts to be cooked.

K indicates a motor having a compound driving function. It has two driving sprockets $K^1$, $K^2$. About $K^1$ passes a belt $K^3$ from which is driven the sprocket $K^4$ on the shaft $K^5$. This shaft terminates in a bevel gear $K^6$ which drives the pinion $K^7$ which in turn drives the gear $K^8$ which actuates the doughnut expelling mechanism in any suitable fashion. The details of the expelling mechanism do not of themselves form part of the present invention. I illustrate, however, a large gear $K^{10}$ in mesh with the gear $K^9$ by rotating in unison with the bevel gear $K^6$ the whole being mounted on a hinged or rotating bracket $K^{11}$. $K^{12}$ indicates the hopper for the dough.

L indicates a driven shaft having secured to it a sprocket $L^1$ about which passes a drive chain $L^2$ driven by the sprocket $K^2$. The shaft L performs several driving functions. In the first place, it is provided with two diametrically opposed crank offsets $L^3$, $L^4$. $L^5$ is a link pivoted to the crank $L^3$ at one end and pivoted to the slide $L^6$ at the other. Through the dog $L^7$ it drives one of the chains $J^3$. An identical structure including the link $L^8$, slide $L^9$ and dog $L^{10}$ drives the other chain, each chain being given a step by step movement in response to rotation of the shaft L. The structure as shown moves the chains alternately, one chain pausing while the other is advanced a step and vice versa. At each end of the crank L is a rotary cam member M with a cam slot or track $M^1$ adapted to engage any suitable cam member $M^2$ associated with the shaft $M^3$ provided with ejector fingers $M^4$. It will be understood that these fingers have the same function as the fingers $H^3$, $H^4$ as shown in Figure 6, and that rotation of the shaft $M^3$ in response to rotation of the cam member M effects the ejection of the cooked doughnuts. $M^5$ is a link pivoted at one end, eccentrically, to the end of one of the rotary cam members M as at $M^6$ at the top of Figure 10. It is secured at the opposite end to a lever $M^7$ which is held in relation to the lever $M^8$ which, by means of a link or rod $M^9$ swings the ejector or dough hopper $K^{12}$ back and forth from the full line to the dotted line position and back, in response to rotation of the shaft L. It will be understood that the mechanism is so timed that the ejector will deposit a doughnut alternately for conveying by each belt, one dough ejector being sufficient for the two belts.

Figure 11:
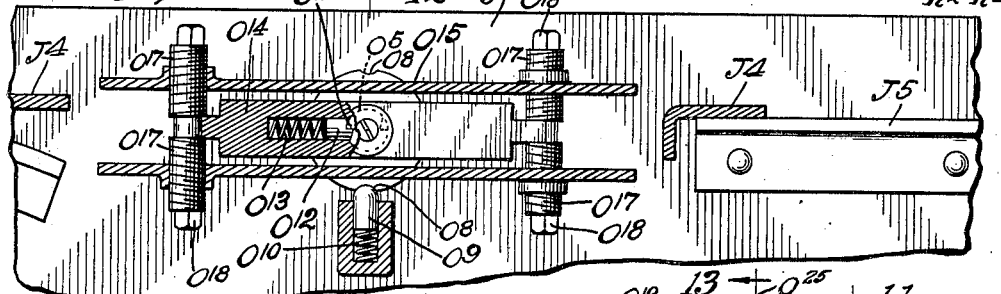
Figure 11 is a section on the line 11—11 of Figures 10 and 12.
Figures 12, 13:
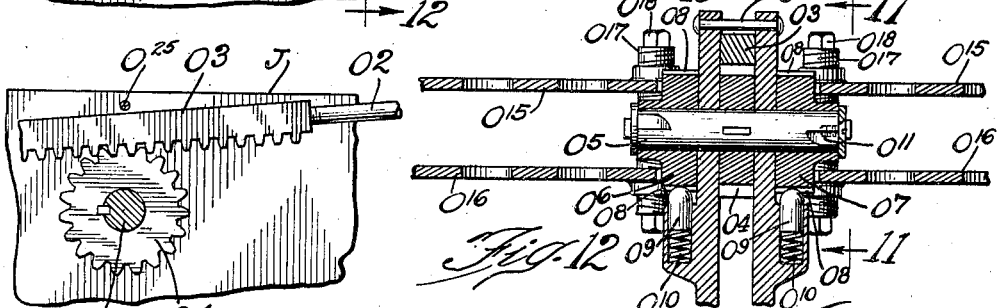
Figure 12 is a section on the line 12—12 of Figure 11.
Figure 13 is a section on the line 13—13 of Figure 12.

Toward the middle of the shaft L is an eccentric member O surrounded by the yoke $O^1$ which communicates with the rod $O^2$ which terminates in a rack $O^3$ in mesh with a pinion $O^4$ on the shaft $O^5$. $O^{25}$ is any suitable pin to prevent the rack $O^3$ from lifting out of mesh with the pinion $O^4$. This structure is shown in detail in Figures 12 and 13. The shaft $O^5$ of course rotates in unison with the pinion $O^4$. It has mounted on each end of it flanged discs $O^6$, $O^7$ each such disc being provided with diametrically opposed slots $O^8$ adapted to be engaged by the yieldingly thrust friction pins $O^9$ thrust by the springs $O^{10}$. An overrunning clutch connection is provided for each of the discs $O^6$, $O^7$ consisting each of a pair of diametrically opposed notches $O^{21}$ in the shaft $O^5$ opposed by a spring thrust plunger $O^{12}$ actuated by the spring $O^{13}$, the plunger and spring being mounted in members $O^{14}$. It will thus be understood that movement of the rack $O^3$ in one direction will rotate one of the discs whereas movement of the rack $O^3$ in the opposite direction will rotate the other disc, the discs rotating in opposite directions and one disc rotating while the other is at rest. Preferably the member $O^{14}$ is made integral with or at least is held against movement in relation to the disc $O^6$ or $O^7$ with which it is associated. As shown in Figures 11 and 12 I employ top and bottom plates $O^{15}$, $O^{16}$ which are mounted adjustably to provide for adjustment to take doughnuts or members of greater or lesser thickness. I illustrate for example rotatable screwthreaded studs $O^{17}$ rotatable for example by the squared heads $O^{18}$. Thus the plates $O^{15}$, $O^{16}$ may be adjusted to any desired separation.

It will be realized that whereas I have described and shown a practical and operative device, nevertheless many changes might be made in the size, shape, number and disposition of parts without departing from the spirit of my invention. I therefore wish my description and drawings to be taken as in a broad sense illustrative and diagrammatic rather than as limiting me to my specific showing. In particular I wish it to be understood that where I employ the term "doughnut" I wish it to cover any article which can practically be cooked in a cooker of the type herein shown and not merely the conventional doughnut. Also, where I employ the term "plate" in connection with the turning device it will be understood that any member which functions like the plate shown is intended to be covered, the term "plate" being used for convenience.

The use and operation of my invention are as follows:

I provide an endless chain or conveyor with a plurality of flights. The chains $C^2$ of Figure 2 or the chains $J^3$ of Figure 10 are both actuated by reciprocated slides $E^9$, $L^9$ or $L^6$, whereby each chain is imparted a uni-directional step by step movement. In each case the raw doughnut is ejected into the hot grease. In the form of Figure 2 it is prevented from sinking all the way to the bottom by engaging the gear C. The same or similar means may be employed in connection with the other form but are not shown. In both forms, however, the doughnut is conveyed as it floats by engagement with flights projecting from the endless chains. At a certain point in the movement of the doughnut it is turned by rotation of the plates $G^{11}$, $G^{12}$ of Figure 4 and the plates $O^{15}$, $O^{16}$, of Figure 12. Then after the other side of the doughnut has been cooked the doughnut is ejected from the cooking cycle by actuation of the fingers $H^3$, $H^4$ of Figure 6 or the fingers $M^4$ of Figure 10, the fingers being shown prior to ejection at the top of Figure 10 and after ejection at the bottom of Figure 10.

In the form of Figures 10 and following, I have illustrated instead of a single chain machine a multiple chain machine but with a single dough feeding or ejecting mechanism $K^{12}$ which automatically swings from chain to chain depositing alternately with each chain. In the form of Figures 10 and following the two chains are shown as moving alternately and the reversing mechanisms for the two chains move alternately as is shown in Figures 11, 12 and 13. It will be realized, of course, that this structure is illustrative and that I do not wish to be limited thereto except to the extent that I limit myself by the precise limitations of my claims.

I claim:

1. In a cooking device, a container adapted to receive a cooking fluid, means for heating said fluid, an endless conveyor chain and means for moving said chain through a predetermined path, and conveying flights on said chain, said flights being secured at one end only to said chain and being positioned in operative relation to articles cooking in said fluid.

2. In a cooking device, a container adapted to receive a cooking fluid, means for heating said fluid, an endless conveyor chain and means for moving said chain through a predetermined path, and conveying flights on said chain, said flights being secured at one end only to said chain and being positioned in operative relation to articles cooking in said fluid and means additional to the chain for supporting the outer ends of said flights.

3. In a cooking device, a container adapted to receive a cooking fluid, means for heating said fluid, an endless conveyor chain and means for moving said chain through a predetermined path, and conveying flights on said chain, said flights being secured at one end only to said chain and being positioned in operative relation to articles cooking in said fluid and means additional to the chain for supporting the outer ends of said flights, including flanges along which said flights are adapted to slide.

4. In a cooking device, a container adapted to receive a cooking fluid, means for heating said fluid, an endless conveyor chain and means for moving said chain through a predetermined path lying in a horizontal plane, and flights on said chain said flights moving in a horizontal plane adjacent the surface of the cooking fluid.

5. In a cooking device, a container adapted to receive a cooking fluid, means for heating said fluid, a conveyor and means for moving said conveyor through a predetermined path lying in a horizontal plane, and conveying flights on said conveyor said flights moving in a horizontal plane adjacent the surface of the cooking fluid, said flights being connected at one end only to said conveyor, and turning means for the articles undergoing cooking, including a pair of spaced plates normally in horizontal position, said plates being positioned above and below the path of movement of said flights, whereby said flights may pass therebetween, and means for periodically turning said plates at a time when no flights are positioned therebetween.

6. In a cooking device, a container adapted to receive a cooking fluid, means for heating said fluid, a conveyor and means for moving said conveyor, and conveying flights on said conveyor, adapted to move in a horizontal plane, and turning means for the articles conveyed by said flights, including a pair of spaced plates through which the flights may pass, and means for turning said plates when an article to be turned is between said plates and at a time when no flight is passing between said plates.

7. In a cooking device, a container adapted to receive a cooking fluid, means for heating said fluid, a conveyor and means for moving said conveyor, and conveying flights on said conveyor, adapted to move in a horizontal plane, turning means for the articles conveyed by said flights, including a pair of spaced plates through which the flights may pass, and means for turning said plates when an article to be turned is between said plates and at a time when no flight is passing between said plates, and means for preventing the escape of the article being turned during the turning operation.

8. In a cooking device, a container adapted to receive a cooking fluid, means for heating said fluid, a conveyor and means for moving said conveyor, and conveying flights on said conveyor, adapted to move in a horizontal plane, turning means for the articles conveyed by said flights, including a pair of spaced plates through which the flights may pass, and means for turning said plates when an article to be turned is between said plates and at a time when no flight is passing between said plates, and means for preventing the escape of the article being turned during the turning operation, including a generally arcuate plate surrounding the path of movement of the turning plates.

9. In a cooking device, a container adapted to receive a cooking fluid, means for heating said fluid, means for feeding the articles to be cooked to said fluid, and means for turning said articles while permitting the articles to float in the cooking fluid, including a plurality of spaced plates, means for conveying the articles to be turned between said plates, and means for turning said plates.

10. In a cooking device, a container adapted to receive a cooking fluid, means for heating said fluid, means for feeding the articles to be cooked to said fluid, and means for turning said articles while permitting the articles to float in the cooking fluid, including a plurality of spaced plates, means for conveying the articles to be turned between said plates, and means for turning said plates, about an axis adjacent the surface of the cooking fluid.

11. In a cooking device, a container adapted to receive a cooking fluid, means for heating said fluid, means for feeding the articles to be cooked to said fluid, and means for turning said articles while the articles are floating in the cooking fluid, including a plurality of spaced plates, means for conveying the articles to be turned between said plates, and means for turning said plates, and means for varying the separation between said plates.

12. In a cooking device, a container adapted to receive a cooking fluid, means for heating said fluid, means for feeding the articles to be cooked to said fluid, means for conveying the articles through said fluid, including a conveyor and means for actuating it, and a sprocket, about which said conveyor passes, said sprocket being positioned beneath the surface of the cooking fluid and being generally aligned with the feeding means and being adapted to receive the articles fed at a time when their buoyancy is insufficient to cause them to float in the cooking fluid.

13. In a cooking device, a plurality of conveyors and means for actuating them, a body of cooking fluid in operative relation with the articles conveyed by each of said conveyors, and means for heating the fluid, and unitary means effective to feed the articles to be cooked to both conveyors, and means for moving said feeding means alternately over each conveyor.

14. In a cooking device, a container adapted to receive a cooking fluid, means for heating said fluid, means for feeding the articles to be cooked to said fluid, a conveyor adapted to convey the articles so fed along a generally horizontal rectilinear path as they float in the cooking fluid, and means, positioned at the end of the conveying path, for ejecting the cooked articles, including a plurality of fingers normally positioned below the level of the articles undergoing cooking, means for lifting them and the articles to be ejected to a point above the fluid and means for receiving the articles so ejected.

15. In a cooking device, a container adapted to receive a cooking fluid, means for heating said fluid, means for feeding the articles to be cooked to said fluid, a conveyor adapted to convey the articles so fed along a generally horizontal path as they float in the cooking fluid and means for ejecting the cooked articles including a plurality of fingers normally positioned below the level of the articles undergoing cooking, means for lifting them and the articles to be ejected to a point above the fluid and means for receiving the articles so ejected, including a plurality of inclined fingers staggered in relation to the ejecting fingers.

16. In a doughnut cooking device, a plurality of sprockets rotatable about vertical and generally parallel axes, a belt element passing about said sprockets, driving means for causing a step by step movement of said belt element, a plurality of flights, each flight being mounted at one end on said belt element, said flights projecting inwardly from said belt, a container in which said flights are immersed and means for heating the liquid contents of said container, means for delivering raw doughnuts to said flights at a predetermined point along the path of movement of said flights and means for turning said doughnuts after they have been conveyed a predetermined distance along the path of movement of said flights, and means for discharging said doughnuts after a predetermined travel beyond said turning means.

17. In a cooking device, a container adapted to receive a cooking fluid, means for heating said fluid, an endless flexible conveyor, and means for moving said conveyor through a predetermined path lying in a horizontal plane, and flights on said conveyor, said flights moving in a horizontal plane adjacent the surface of the cooking fluid.

18. In a cooking device, a container adapted to receive a cooking fluid, means for heating said fluid, a conveyor and means for moving it, conveying members on said conveyor adapted to move the articles undergoing cooking through a predetermined path, while permitting said articles to float freely in the cooking fluid, and means for turning said articles, while floating freely in the cooking fluid, said articles while being turned being sustained in the fluid in response to their own buoyancy.

19. In a cooking device, a container adapted to receive a cooking fluid, means for heating said fluid, means for feeding to said fluid the articles to be cooked, said articles being rendered buoyant by cooking, and means for turning said articles, while permitting the articles to float in the cooking fluid, with the buoyancy of the articles determining their position in the fluid during the turning movement.

20. In a cooking device, a plurality of flexible endless conveyors and means for actuating them, said conveyors extending in general parallelism and including guiding members rotatable about vertical axes, a body of cooking fluid in operative relation with the articles conveyed by each of said conveyors, means for heating the fluid, and unitary means effective to feed the articles to be cooked to both conveyors, said means being movably mounted adjacent said conveyors, and means for positioning it in succession in operative relation with each conveyor.

21. In a cooking device, a plurality of flexible endless conveyors and means for actuating them, said conveyors extending in general parallelism and including guiding members rotatable about vertical axes, a body of cooking fluid in operative relation with the articles conveyed by each of said conveyors, means for heating the fluid, means for turning the articles undergoing cooking, said means including a turning device associated with each conveyor, said turning devices being adjacent each other, and unitary means for actuating them.

22. In a cooking device, a container adapted to receive a cooking fluid, means for heating said fluid, an endless conveyor chain and means for guiding said chain through a predetermined path, flights on said chain, moving in a horizontal path adjacent the surface of the cooking fluid, means for imparting to said chain and flights a step by step conveying movement, means for turning the articles undergoing cooking, including a turning member normally positioned out of the path of the conveyor flights, and means for rotating said member during the pauses between the steps of the conveying movement of the chain and flights.

23. In a cooking device, a container adapted to receive a cooking fluid, means for heating said fluid, means for feeding to said fluid the articles to be cooked, and means for turning said articles, while permitting the articles to float in the cooking fluid, with the buoyancy of the articles determining their position in the fluid during the turning movement, a conveyor adapted to move said articles forwardly while they are floating in the cooking fluid, said turning means being positioned in the line of movement of said conveyor, means for imparting to said conveyor and the articles a step by step movement, and means for actuating the turning means between the steps of movement of the conveyor.

24. In a cooking device, a container adapted to receive a cooking fluid, means for heating said fluid, means for feeding the articles to be cooked to said fluid, means for conveying the articles through said fluid, including a conveyor and means for actuating it, said conveyor including flights positioned adjacent the surface of the cooking fluid, and an additional conveying means including an extended horizontal article supporting surface rotatable about a vertical axis, positioned substantially below the surface of the cooking fluid to receive and convey the articles fed at a time when their buoyancy is insufficient to cause them to float in the cooking fluid submerged in said fluid beneath the path of movement of said conveyor flights whereby when buoyant, said articles will rise to the surface of the fluid in position to be engaged by said flights.

25. In a cooking device, a container adapted to receive a cooking fluid, means for heating said fluid, means for feeding the articles to be cooked to said fluid, means for conveying the articles through said fluid, including a conveyor and means for actuating it, said conveyor including flights positioned adjacent the surface of the cooking fluid, said conveyor actuating means including a sprocket gear positioned substantially below the surface of the cooking fluid and rotatable about a vertical axis, said sprocket gear having a horizontally disposed web portion positioned to receive and convey the articles fed at a time when their buoyancy is insufficient to cause them to float in the cooking fluid submerged in said fluid beneath the path of movement of said conveyor flights whereby when buoyant, said articles will rise to the surface of the fluid in position to be engaged by said flights, said sprocket gear being movable in unison with the first mentioned conveyor.

26. A doughnut cooking machine comprising a receptacle for cooking liquid, a doughnut former positioned and operable to deposit doughnuts in the liquid at a predetermined point and at definite intervals, a single, uni-directional conveyor for directing the doughnuts through the machine in a predetermined direction of movement, and a device located in the course of travel of the doughnuts for turning them over, said device being intermittently operable and adapted to turn the doughnuts in the section of the conveyor in which they travel to said turning device.

27. In apparatus for handling doughnuts afloat at the surface of the cooking liquor, the combination of means for feeding along or progressing the floating doughnuts comprising a succession of traveling pushers with spaces for doughnuts between them; and a turnover device arranged to turn about a substantially horizontal axis approximately at the surface of the cooking liquor, and comprising upper and lower engagement members affording space between them for passage of said pushers and of the doughnuts, but adapted to engage the floating doughnuts on top and underneath and turn them over, successively, about said horizontal axis, by turning movement of said device between the pushers associated with each doughnut so turned.

28. A turnover device, for doughnuts afloat on the cooking liquor, comprising a fork mounted and arranged to turn about a substantially horizontal axis approximately at the surface of the cooking liquor and embodying a pair of prongs oppositely offset from said axis and adapted and arranged to engage a floating doughnut on top and underneath, respectively, and thus turn it over about said horizontal axis when the fork is correspondingly turned thereabout.

29. In apparatus for handling doughnuts afloat at the surface of cooking liquor, the combination of means for feeding along or progressing the floating doughnuts comprising a moving support with a series of pusher arms projecting horizontally therefrom, approximately at the surface of the liquor, with spaces for doughnuts between them; and a turnover device comprising a two-prong fork mounted and arranged to turn about a substantially horizontal axis approximately in line with the passing pusher arms, with its prongs directed toward said moving support and overlapping said pusher arms, but oppositely offset from the fork axis and affording space between them for passage of said pusher arms and of the doughnuts, adapted to engage the floating doughnuts on top and underneath and turn them over, successively, about said horizontal axis, by a turning movement of said fork between the pushers associated with each doughnut so turned.

30. In apparatus for handling doughnuts afloat at the surface of the cooking liquor, the combination of means for feeding along or progressing the floating doughnuts comprising a succession of travelling pushers with spaces for doughnuts between them; a turnover device arranged to turn about a substantially horizontal axis approximately at the surface of the cooking liquor, and comprising upper and lower engagement members affording space between them for passage of said pushers and of the doughnuts, but adapted to engage the floating doughnuts on top and underneath and turn them over, successively, about said horizontal axis, by turning movment of said device between the pushers associated with each doughnut so turned; and means for moving said pregressing means step by step while the turnover device remains substantially at rest, and for turning the latter to turn over the doughnuts while the progressing means is substantially at rest.

CHARLES E. CARPENTER.